(12) United States Patent
Jang

(10) Patent No.: US 11,473,557 B2
(45) Date of Patent: Oct. 18, 2022

(54) SAIL DEVICE

(71) Applicants: EDONA INC., Needham, MA (US); GeungDug Jang, Gyeongsangbukdo (KR)

(72) Inventor: GeungDug Jang, Gyeongsangbukdo (KR)

(*) Notice: Subject to any disclaimer, the term of this patent is extended or adjusted under 35 U.S.C. 154(b) by 0 days.

(21) Appl. No.: 16/625,344

(22) PCT Filed: Jun. 22, 2017

(86) PCT No.: PCT/JP2017/022988
§ 371 (c)(1),
(2) Date: Dec. 20, 2019

(87) PCT Pub. No.: WO2018/235220
PCT Pub. Date: Dec. 27, 2018

(65) Prior Publication Data
US 2022/0003205 A1 Jan. 6, 2022

(51) Int. Cl.
*F03D 5/04* (2006.01)
*F03D 3/00* (2006.01)
*F03D 3/02* (2006.01)

(52) U.S. Cl.
CPC ............... *F03D 5/04* (2013.01); *F03D 3/005* (2013.01); *F03D 3/02* (2013.01)

(58) Field of Classification Search
CPC .................................. F03D 3/068; F03D 5/04
See application file for complete search history.

(56) References Cited

U.S. PATENT DOCUMENTS

| 6,016,014 A | 1/2000 | Grigorescu et al. |
| 7,780,416 B2 | 8/2010 | Al-Azzawi |

(Continued)

FOREIGN PATENT DOCUMENTS

| CN | 102 418 664 B | 2/2008 |
| CN | 102 182 628 A | 9/2011 |

(Continued)

OTHER PUBLICATIONS

Machine translation of JP 2005180346 A (Jul. 7, 2005) (Year: 2005).*

(Continued)

*Primary Examiner* — Christopher R Legendre
(74) *Attorney, Agent, or Firm* — Shlesinger, Arkwright & Garvey LLP

(57) ABSTRACT

Sail movement is achieved having rotation while revolving, using a simple structure that does not easily break. A sail device includes a supporting body, a sail body, a guide track comprising recessed portions, and engaging portions. Rotational energy is output from or input to a rotating body forming part of the supporting body. The sail body is attached to the supporting body which freely rotates, and revolves around an axis of the supporting body. The sail body converts fluid energy into rotational energy or converts rotational energy into fluid energy on the basis of the motion of the sail body which contacts a fluid. In the guide track, two recessed portions are continuous with one another, and form an endless track which defines an angle of rotation of the sail body during the process of revolving. The engaging portions engage the sail body with the guide track, and displace the sail body along the guide track.

6 Claims, 11 Drawing Sheets

(56) References Cited

U.S. PATENT DOCUMENTS

| | | | | |
|---|---|---|---|---|
| 9,797,372 | B2* | 10/2017 | Iqbal | ........................ F03D 3/005 |
| 2013/0001950 | A1 | 1/2013 | Armstrong | |
| 2022/0003205 | A1* | 1/2022 | Jang | .......................... F03D 3/04 |

FOREIGN PATENT DOCUMENTS

| DE | 196 11 906 A1 | 10/1997 | |
|---|---|---|---|
| JP | 197759243 A | 5/1977 | |
| JP | 2004-197643 A | 7/2004 | |
| JP | 2005-180346 A | 7/2005 | |
| JP | 2008-14303 A | 1/2008 | |
| JP | 2008 042976 A | 2/2008 | |
| KR | 100821517 | 4/2008 | |
| KR | 101038436 | 3/2010 | |
| KR | 10-2010-0027571 | 3/2020 | |
| WO | WO 2007/113402 A1 | 10/2007 | |
| WO | WO-2010031200 A1 * | 3/2010 | ............. F03D 3/068 |

OTHER PUBLICATIONS

Machine translation of DE 19611906 A1 (Oct. 2, 1997) (Year: 1997).*

Machine translation of JP 2008014303 A (Jan. 24, 2008) (Year: 2008).*

International Search Report (ISR) in PCT/JP2017/022988, ISR dated Sep. 12, 2017 (5 pages).

International Preliminary Report on Patentability (IPEP) in PCT/JP2017/022988, ISR dated Dec. 24, 2019 (5 pages).

KIPO Amendment in Korean Applic. 10-2019-7037781, dated Apr. 29, 2020 (8 pages).

KIPO Amendment in Korean Applic. 10-2019-7037781, English Translation, dated Apr. 29, 2020 (7 pages).

KIPO Patent Decision in Korean Applic. 10-2019-7037781, responsive to Apr. 29, 2020 Amendment, Decision dated Jun. 10, 2020 (2 pages).

KIPO Patent Decision in Korean Applic. 10-2019-7037781, responsive to Apr. 29, 2020 Amendment, English Translation, Decision dated Jun. 10, 2020 (1 page).

Supplementary European Search Report in EP 17 91 4129, dated Nov. 27, 2020 (2 pages).

EPO Communication in EP 17914129, dated Jan. 14, 2021 (5 pages).

English translation of KR 10-2010-0027571, published Mar. 11, 2010 (27 Pages).

* cited by examiner

SAIL DEVICE

TECHNICAL FIELD

The present invention concerns a sail device which has rotating sails while revolving around a common axis.

BACKGROUND ART

Generally, prime movers which generate power with their bladed wheels receiving a moving fluid are known to be classified into the lift-type prime mover and the drag-type prime mover. The lift-type prime mover obtains torque by mainly utilizing drag forces (the component of force on the blades perpendicular to the direction of the fluid flow) and is widely used around the world, for example, for wind power generators (propeller windmills). This type of prime mover, however, has a heavy and large structure and its center of gravity at a high position. In addition, it is not durable because its windmill (blades) rotates faster (up to about 11 times faster) than the wind speed, and its maintenance is hard because of its complex structure. Furthermore, it is equipped with a brake system in the nacelle to prevent failures resulting from, for example, vibration at high-speed windmill rotation, and the rotational speed of the windmill is restricted below a certain upper limit. In this case, the upper rotational speed sets the rated power (limit) and thus restrains the further use of wind energy. Thus, its efficiency of energy conversion is not high. It also has a nonnegligible environmental problem, such as wind noise produced by the blades. To solve these problems, drag-type prime movers are drawing attention. The drag-type prime mover obtains torque by utilizing mainly the drag force (the component of force on the blades parallel to the direction of the fluid flow). Unlike the lift-type prime mover, the rotational speed of the windmill (sails) of this type of prime mover is naturally limited below the wind speed.

For example, patent document 1 discloses a drag-type prime mover (energy conversion system) as shown in FIG. 18. This prime mover is equipped with a cross-shaped rotor 40 pivoting on an axis and four blades 70 each of which is installed on the tip of each of four arms of the rotor 40. These blades 70 are installed for free rotation on the rotor 40 and revolve around the axis of the rotor 40. The axis fixing each blade 70 is connected, through a gear mechanism, one-to-one with a propeller shaft 58 which extends in the radial direction in the rotor 40, and the rotation angle of each blade 70 is adjusted by power provided by the corresponding propeller shaft 70. Concretely, each blade receives the wind at its maximum blade area (100%) when its rotation angle is 0 degrees and at its minimum blade area (nearly 0%) when its rotation angle is 180 degrees. The blade area receiving the wind gradually changes from the maximum to the minimum in the course from 0 to 180 degrees and from the minimum to the maximum in the course from 180 to 360 degrees. Adjusting the rotation angle of each blade 70 according to its position of revolution causes an imbalance in the total force of the wind on all the blades 70, which results in the rotation of the rotor 40.

Furthermore, patent document 2 discloses a drag-type prime mover (blinking sail windmill) as shown in FIG. 19. This prime mover consists mainly of multiple wide frames B installed on the axis A, and the wide frames B rotate around the axis A as a unit. Each wide frame B is installed with multiple bars extending horizontally at fixed intervals, and each horizontal bar is equipped with a sheet C which can be opened but is always driven to close by springs. Adjacent sheets C overlap with each other, and they can be opened in the wind direction H but not in the opposite direction. This structure allows the wind to open the sheets C of the wide frame B on the left side in the figure against the driving force of the springs and to pass through them. On the wide frame B on the right side, however, the totally closed sheets C fully receive the wind. The resulting imbalance of the wind force on the sheets on the two sides causes the united wide frame B to rotate.

PRIOR ART DOCUMENTS

Patent Documents

Patent Document 1: International Pub. WO/2007/113401
Patent Document 2: U.S. Pat. No. 7,780,416

SUMMARY OF INVENTION

Technical Problem

The existing technologies described above, however, adopt structures which are complex and prone to break to achieve such a motion of sails as rotating while revolving, and are therefore hard to be implemented. In fact, the drag-type prime mover of patent document 1 has a complex structure arising from its gear mechanism. Since the gear mechanism causes energy loss (such as a low efficiency of power transmission and the generation of heat and noise), the energy conversion efficiency of the whole system is lowered. In addition, stress intensively acting on each gear tends to cause the breakage of the gear system. In case of the drag-type prime mover of patent document 2, the swept area of the sails is adjusted by the elastic force of the springs, and thus this mechanism does not function unless the wind speed is considerably high. Therefore, both the drag-type prime movers are difficult to be implemented.

Thus, the objective of the present invention is to realize such a motion of sails as rotating while revolving by adopting a structure which is relatively simple and hard to break.

Solution to Problem

To solve the said problem, the present invention provides a sail device having supporting bodies, sail units, guide tracks and engagement parts. The sail units are installed for free rotation on the supporting bodies and revolve about the axis of the supporting bodies. The guide tracks are closed tracks and regulate the rotation angles of the sail units in the course of their revolution. The engagement parts engage the sail units with the guide tracks and allow the sail units to move along the guide tracks.

In the present invention, each guide track described above may satisfy the equations given below, where the radius of revolution of the sail unit is $r_T$, the radius of rotation of the sail unit is $r_P$, and the revolution angle of the sail unit with respect to the positive x axis is θ. The following equations use a Cartesian coordinate system having an abscissa x-axis and an ordinate y-axis.

[Exp. 1]

$$x_T^2 + y_T^2 = r_T^2$$

Upper-half region (y≥0, 0°≤θ≤180°)

$$x = r_T \cos\theta \pm r_P \cos\theta$$

$$y = r_T \sin\theta \pm r_P \sin\theta$$

Lower-half region (y<0, 180°<θ<360°)

$$x = r_T \cos\theta \pm r_P$$

$$y = r_T \sin\theta$$

In the present invention, each guide track described above may also satisfy the equations given below, where the radius of revolution of the sail unit is $r_T$, the radius of rotation of the sail unit is $r_S$, and the revolution angle of the sail unit with respect to the negative y axis is θ. The following equations use a Cartesian coordinate system having an abscissa x-axis and an ordinate y-axis.

[Exp. 2]

$$x_T^2 + y_T^2 = r_T^2$$

$$x = r_T \sin\theta \pm r_S \cos \tfrac{1}{2}\theta$$

$$y = r_T \cos\theta \pm r_S \sin \tfrac{1}{2}\theta$$

It is desirable that multiple sail units are installed in the present invention at certain intervals. In this case, it is desirable that the engagement parts described above are installed on each sail unit. In addition, the engagement parts may be installed on the edges of each sail unit through movable joints.

In the present invention, the guide tracks described above may be divided into the first guide track and the second guide track, and the engagement parts described above may be divided into the first engagement parts and the second engagement parts. The first guide track is disposed on one side of the sail unit edges. The second guide track is disposed on the other side of the sail unit edges and has the track pattern same as or similar to that of the first guide track in a state of the first and second guide tracks confronting each other. The first engagement parts engage the edges of the sail units on one side with the first guide track, and the second engagement parts engage the edges of the sail units on the other side with the second guide track.

In the present invention, multiple engagement parts may be installed, as the first engagement parts described above, around the axis of sail unit rotation on one edge of each sail unit for engaging the sail unit with the first guide track, and multiple second engagement parts may be installed, as the second engagement parts described above, around the axis of sail unit rotation on the other edge of the sail unit for engaging the sail unit with the second guide track.

The present invention may be equipped with mounting plates which are installed swingably on a supporting shaft, the first sail device and the second sail device. The first sail device is installed on the mounting plates and disposed on the right side of the supporting shaft, and the second sail device is installed on the mounting plates and disposed on the left side of the supporting shaft. The first and second sail devices are both the sail device described above, and the guide tracks of the first sail device and those of the second sail device are symmetrically disposed.

The present invention may also be equipped with a mechanism which collects and supplies fluid to the sail device(s).

Advantageous Effects of Invention

The present invention enables to adjust the rotation angles of the sail units in the course of their revolution by means of the guide tracks with a relatively simple structure. In addition, since no gear mechanism is necessary to regulate the rotation angles of the sail units, the system is hard to break and thus highly durable.

Especially, if the present invention is applied to an energy conversion system which converts fluid energy into rotational energy or rotational energy into fluid energy by means of the motion of sails in contact with fluid, a high efficiency of energy conversion can be achieved with a relatively simple structure, and a highly practical energy conversion system can be realized. Furthermore, if the first and the second sail devices are disposed so that their guide tracks are symmetrical, external forces act evenly on these sail devices, and the direction of the sail devices can be automatically adjusted rightly against the wind direction. In addition, the amount of energy conversion can be increased by increasing the amount of fluid supplied to the sail devices with an additional mechanism of collecting fluid.

DESCRIPTION OF EMBODIMENTS

First Embodiment

Figure 1:
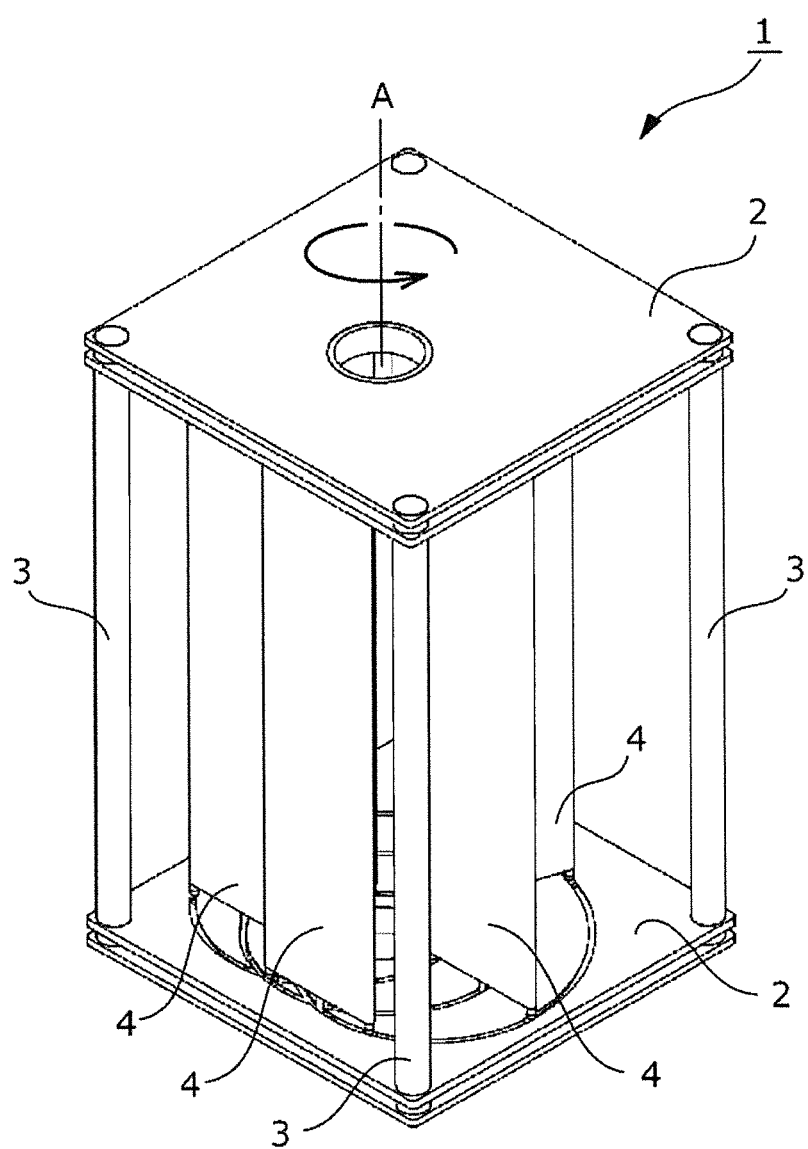
FIG. 1 An external perspective view of the sail device concerning the first embodiment.

FIG. 1 is an external perspective view of the sail device concerning the first embodiment.

The sail device 1 consists mainly of a pair of supporting bodies 2, multiple connecting rods 3 and multiple sail units 4. The pair of supporting bodies 2 are disposed separated along the direction of the axis A (the axis of revolution of the sail units 4) and confronting each other. The supporting bodies 2 are connected with each other by means of the connecting rods 3 at their four corners to form a unified casing. The multiple sail units 4 are sandwiched by the supporting bodies 2 and revolve as a unit around the axis A.

This embodiment assumes the case of using it as a mechanism of converting fluid energy into rotational energy by rotating the sail units 4 as a result of them receiving the flow of fluid (for example, the wind): for example, a drag-type prime mover. For obtaining fluid energy, any type of fluid, including gas, liquid and plasma, can be used, and the sail device 1 can be applied not only to wind power generation but also to hydropower generation and tidal power generation. In addition, energy resulting from conversion can be any type of energy, including not only electric energy but also kinetic energy, potential energy and thermal energy. Possible systems are, for example, electric generators as well as pumps (oil or water), compressors (air) and mechanical arms (compression or squeezing).

The sail device 1 concerning this embodiment can also be used as a mechanism for converting rotational energy into fluid energy by generating the flow of fluid by means of the rotation of the sail units 4, for example, as a propulsion unit for a ship. It is noted that the sail device can be used in a vertical position as shown in the figure or in a horizontal position. Furthermore, multiple sail devices 1 can be placed side by side or stacked vertically.

Although in principle only one sail unit is enough for the sail device to function, it is desirable to have multiple sail units for increasing the efficiency of energy conversion. Since each sail unit rotates while revolving around the axis A, however, the multiple sail units need to be separated at certain intervals so that they do not interfere with each other. Its detail explanation will be given later. Not interfering with each other here means not only that the sail units 4 do not contact physically but also that any of the sail units does not severely hinder the passage of the wind for other sail units.

The size of the sail device 1 is determined according to the purpose and installation place of its application. In case of constructing a power plant (power generators), for example, either a small number of large-size sail devices 1 or many small-size sail devices 1 can be installed. In case of installing sail devices 1 vertically and/or horizontally on a building wall, it is effective to install many small sail devices 1.

Figure 2:
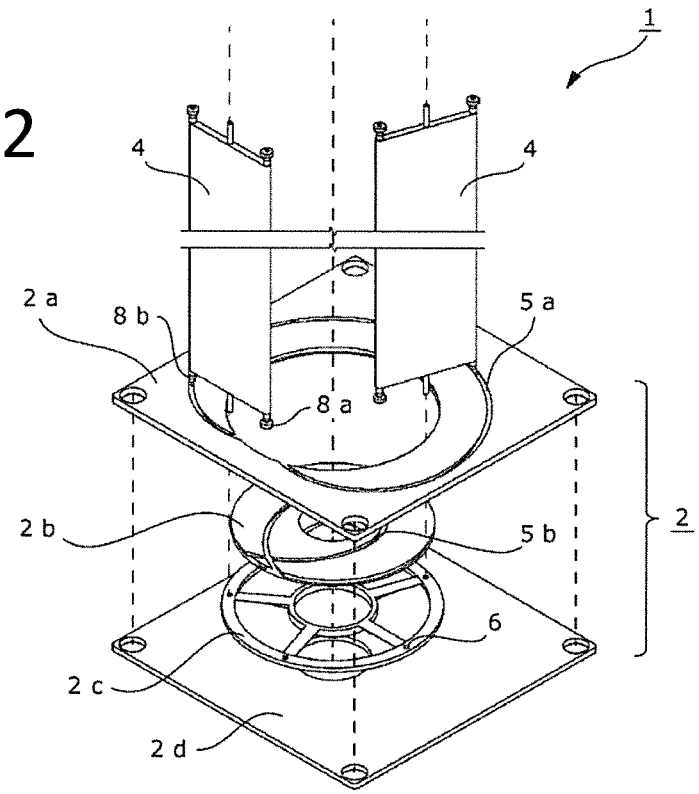
FIG. 2 An exploded view of the main part of the sail device.

FIG. 2 is an exploded view of the main section of the sail device 1. Although the figure shows only the lower supporting body 2 of the upper and lower supporting bodies 2 shown in FIG. 1, the constitution of the upper supporting body 2 is basically the same as the one shown in FIG. 2. The supporting body 2 consists of the outer guide plate 2a, the inner guide plate 2b, the hollowed rotary disk 2c and the base plate 2d, which are assembled in such a way that the rotary disk 2c is sandwiched by the three plates 2a, 2b and 2d.

The rectangular outer guide plate 2a has round holes at its four corners for inserting the connecting rods 3 and a perfect circle opening in the vicinity of its center. In addition, the groove 5a extending in a curve is provided outside this opening on the surface of the outer guide plate 2a. The inner guide plate 2b is a perfect circle component having a diameter slightly smaller than that of the circular opening of the outer guide plate 2a and is equipped with the groove 5b extending in a curve. Furthermore, the inner guide plate 2b has a circular opening at its center. The rotary disk 2c has a shape in which the inner and outer concentric rings are connected in the radial direction. The outer ring has the mounting holes 6 as many as the number of the sail units 4 for installing the sail units 4 for free rotation, where the mounting holes are provided at equal intervals on the circumference of the outer ring. The rectangular base plate 2d has round holes at its four corners for inserting the connecting rods 3 and a perfect circle opening in the vicinity of its center.

Figure 3:
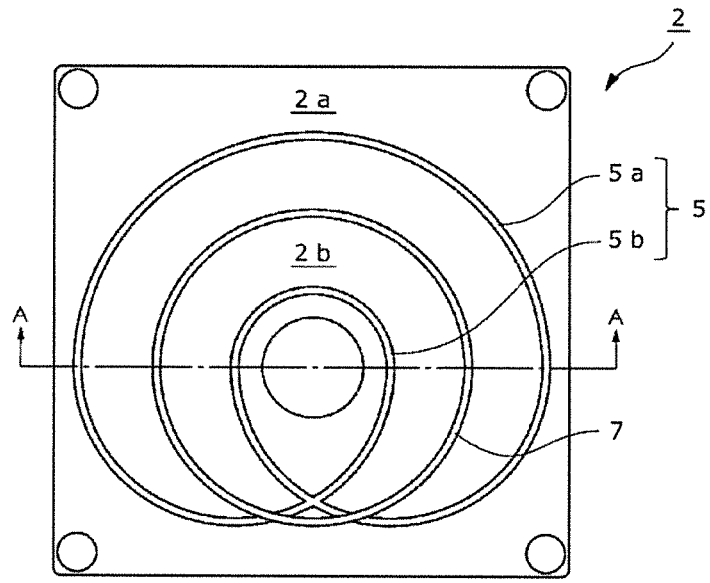
FIG. 3 Top view of the supporting body.
Figure 4:
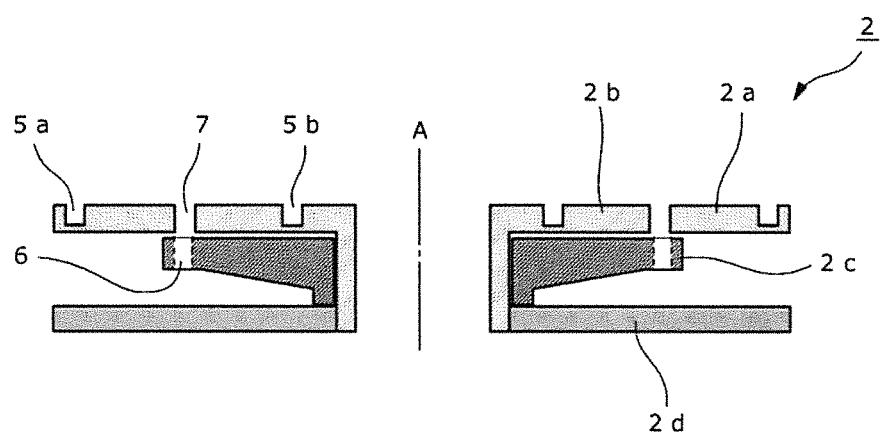
FIG. 4 A sectional view along A-A of FIG. 3.
Figure 5:
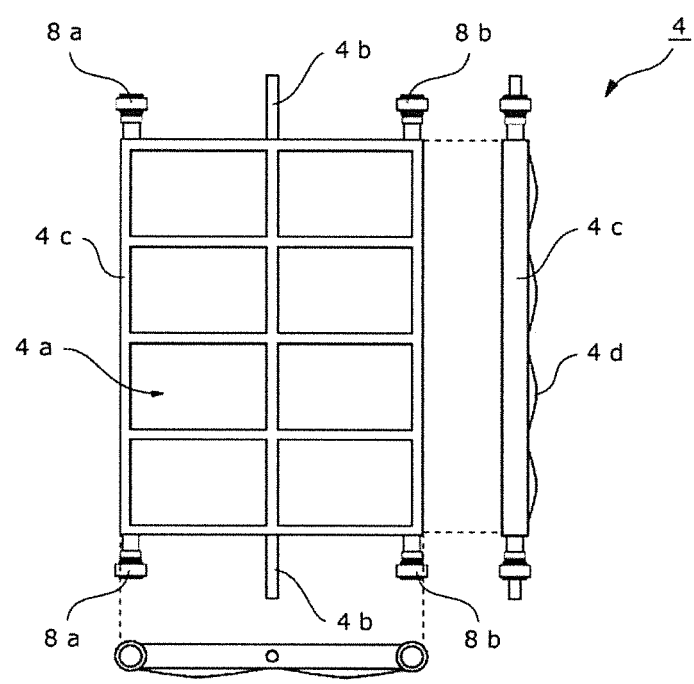
FIG. 5 An example front view of the sail unit.
Figure 6:
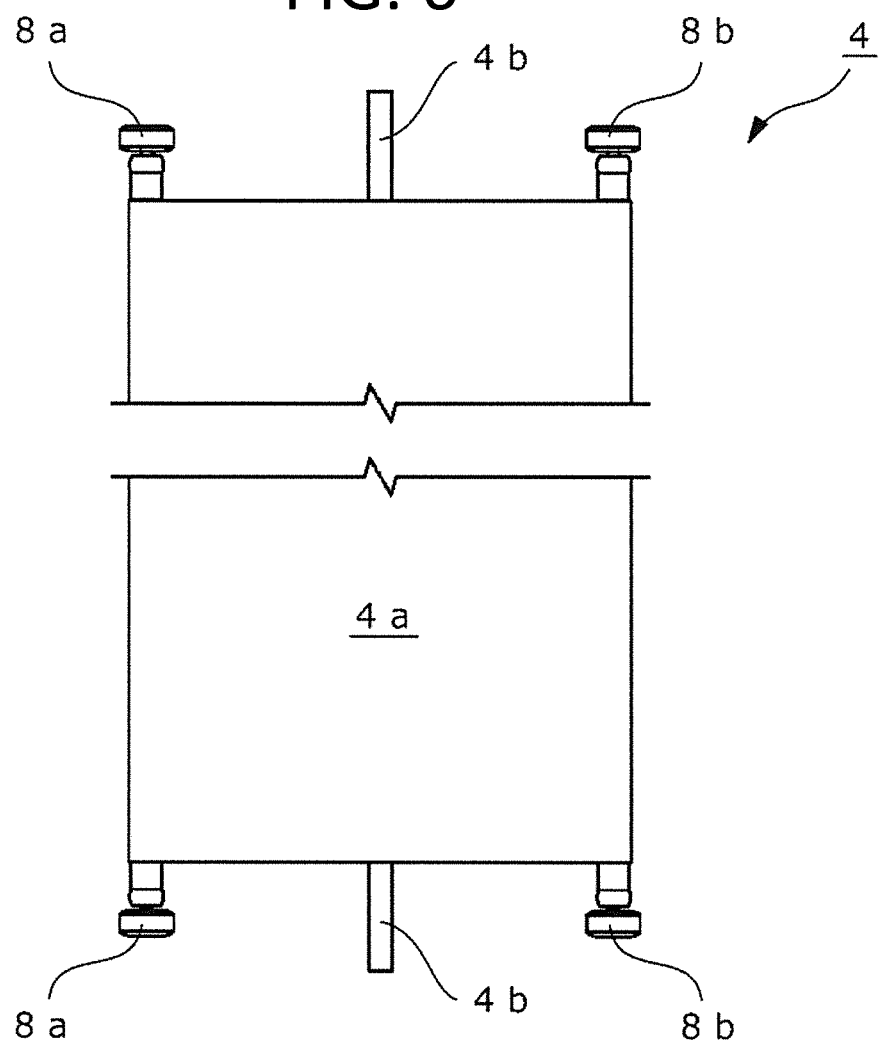
FIG. 6 Another example front view, side view and bottom view of the sail unit.

FIG. 3 is a top view of the supporting body 2 which is an assembly of the components 2a~2d, and FIG. 4 is an A-A sectional view of the supporting body 2. When assembled as a unit, the outer guide plate 2a and the base plate 2d are fixed by the four connecting rods. The cylindrical section of the inner guide plate 2b which extends downward around the center of the inner guide plate 2b is inserted into the opening of the base plate 2d, whereby locking the inner guide plate 2b to the base plate 2d. In this state, the top surface of the inner guide plate 2b is flush with the top surface of the outer guide plate 2a.

As show in FIG. 3, the flush surfaces of the guide plates 2a and 2b form the guide track 5 and the circular crevice extending through the guide plates. The guide track 5 consists of the groove 5a of the outer guide plate 2a and the groove 5b of the inner guide plate 2b and is a closed continuous curve. This guide track 5 regulates the rotation angles of the sail units 4 in the course of their revolution. On the other hand, the circular crevice 7 is formed as a result of the difference between the opening diameter of the outer guide plate 2a and the outer diameter of the inner guide plate 2b, has the width equal to the difference in diameter and extends circularly on the surface of the two guide plates. This circular crevice 7 functions as room (an escape) for avoiding the interference between the guide plates 2a and 2b and the sail units 4 during revolution, whereby allowing the rotation (revolution) of the sail units 4 around the axis A.

As shown in FIG. 4, the cylindrical section of the inner guide plate 2b is inserted into the rotary disk 2c, which is sandwiched from above and below by the guide plates 2a and 2b and the base plate 2d. Consequently, the rotary disk 2c is positioned by the said cylindrical section and housed for free rotation within the supporting body 2.

Ag 5 is a front view of the sail unit 4. The main component of the sail unit 4 is the sail 4a which receives the wind. The material of the sail 4a is typically lightweight and highly rigid metal or fiber-reinforced plastic formed into a panel (rectangular panel) or can be more widely a resin material, fiber material, reinforced wood or ceramic. In addition, as shown in Ag. 6, the sail 4a can be a simple or lattice frame 4c made of metal or fiber-reinforced plastic to which the sheet 4d is attached. It is desirable that the material of the sheet 4d is lightweight such as cloth, thin plate, film, foil, plastic wrap or membrane and is also low water-absorbent (does not become heavy when wet), low light-curing (not hardened by the sunlight), low reflective (does not reflect the sunlight much) and antifreezing (does not freeze with winter rain). Furthermore, using a transparent or semitransparent material for the sheet 4d makes the sail device 1 less conspicuous in the surroundings of installation. In recent years when the protection of landscape is more demanded, the color and design of the sail 4a is an important factor for installation. The surface of the sail 4a can be any of flat, curved, streamline, sine-wave, square-wave, triangular-wave and sawtooth-wave surfaces. The axle 4b protruding in the direction of the axis A is installed at the center of each edge of the sail 4a. The upper axle 4b is inserted into the mounting hole 6 provided by the upper supporting body 2 (the rotary disk 2c), and the lower axle 4b into the mounting hole 6 provided by the lower supporting body 2 (the rotary disk 2c). Consequently, the multiple sail units 4 are joined via the rotary disk 2c and revolve around the axis A as a unit.

A pair of engagement parts 8a and 8b protruding in the direction of the axis A are installed on the right and left sides of each edge of the sail unit 4. The upper engagement parts 8a and 8b engage the upper edge of the sail unit 4 with the guide track 5 provided by the upper supporting body 2, and the lower engagement parts 8a and 8b engage the lower edge of the sail unit 4 with the guide track 5 provided by the lower supporting body 2. Consequently, the upper and lower edges of the sail unit 4 are stably supported each at three points, including the support by the axle 4b. However, if the sail unit 4 has a relatively short longitudinal side or if the area of wind reception of the sail 4a does not need to be large, the number of supporting points can be reduced, for example, by installing only the engagement part 8a on the upper edge and only the engagement part 8b on the lower edge. As a most extreme case, it is possible that the upper edge of the sail unit 4 is supported only by the axle 4b and its lower edge by either of the engagement parts 8a and 8b, which results in the support of the sail unit 4 with two points (the upper guide track 5 is unnecessary in this case). On the other hand, if the sail unit 4 has a very long longitudinal side or if the area of the sail 4a is large, it is desirable to increase the number of supporting points and/or guide tracks as needed to increase the supporting stability of the sail unit 4.

If the guide track 5 is concave as in the present embodiment, the engagement parts 8a and 8b should basically be convex. On the other hand, if the guide track 5 is convex like a railroad rail, the engagement parts 8a and 8b should basically be concave. In a simple concave-convex engagement, however, it is concerned that the loss of energy (heat and noise) due to friction (sliding resistance) between the two parts may occur, whereby reducing the efficiency of energy conversation. Therefore, a structural means for reducing friction between the guide track 5 and the engagement parts 8a and 8b is contrived in the present embodiment.

Figure 7:
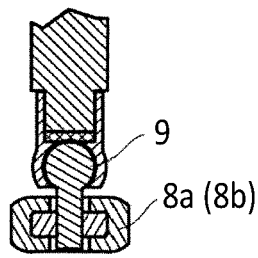
FIG. 7 A main sectional view of the vicinity of the engagement part.
Figure 8:
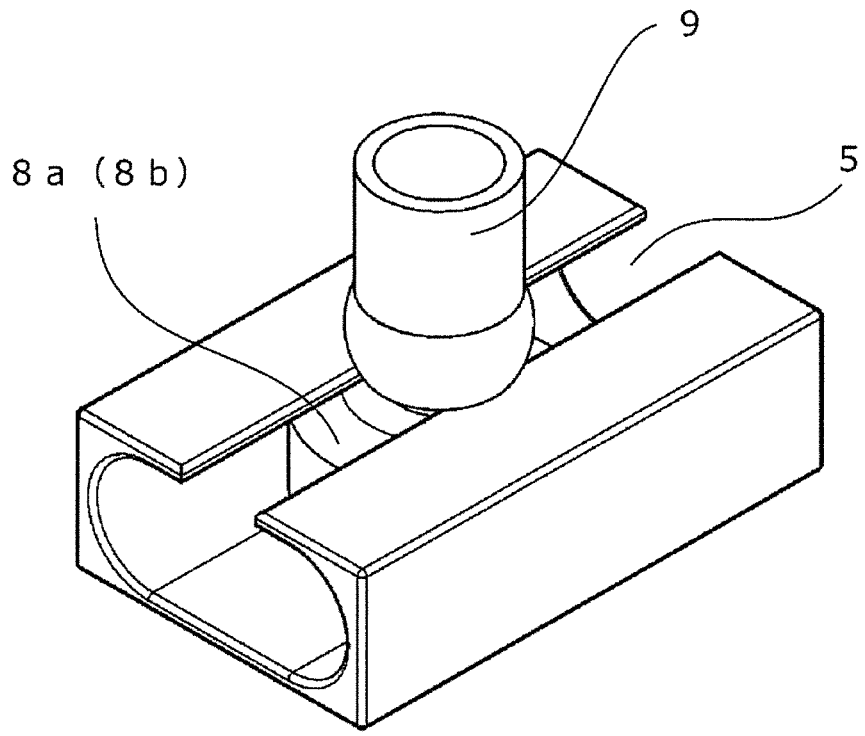
FIG. 8 A view illustrating the engagement between the guide track and the engagement part.

FIG. 7 is a sectional view of the main section in the vicinity of the engagement part 8a (or 8b), and FIG. 8 illustrates its engagement with the guide track 5. A rolling bearing forms the engagement part 8a and is installed on the sail unit 4 by means of the movable joint 9 (for example, a ball joint). The reason for using such a joint 9 is for absorbing the distortion of the sail unit 4 which tends to occur if the sail unit 4 is long and to cause an excessive load on the engagement part 8a being engaged with the guide track 5. As long as the engagement parts 8a and 8b have a function of engaging the sail unit 4 with the guide track 5, they can be any mechanism. They can be fixed parts or movable link mechanisms. The rolling bearing and the movable joint shown in FIG. 7 can be thought as a link mechanism.

Figure 9:
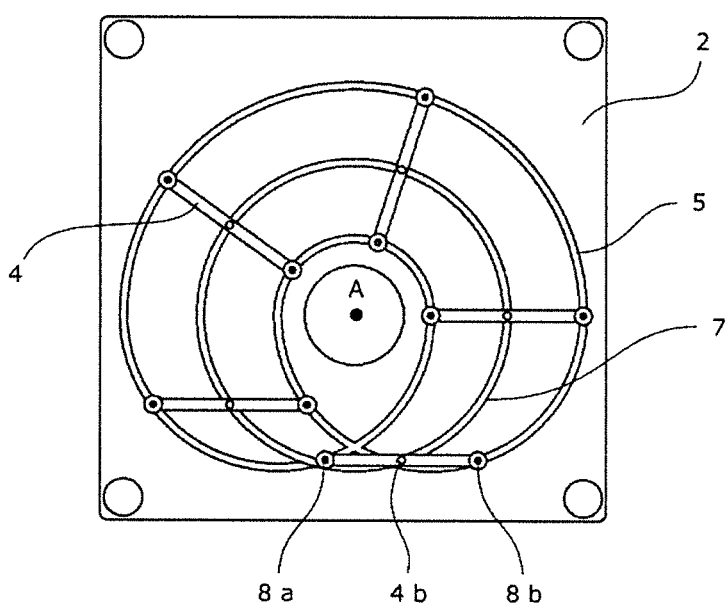
FIG. 9 A top view of the supporting body installed with sail units.

FIG. 9 is a top view of the supporting body 2 (on a side) installed with multiple sail units 4. In the constitution in which the guide track 5 is provided for each edge side of the rectangular sail units 4, the pair of the guide tracks 5 have the same track pattern (trace one) in a state of them confronting each other (in the assembled state of the sail device 1). If the distance from the axle 4b to the engagement part 8a or 8b is the same on both edge sides of the sail unit 4, the sizes of the guide tracks 5 on both edge sides are the same. The distance from the axle 4b to the engagement part 8a or 8b, however, can be different on the two edge sides. In this case, the guide tracks on the two edge sides have different sizes but are similar. Concretely, if the distance from the axle 4b to the engagement part 8a or 8b is larger on one edge side than on the other edge side, the guide track 5 on the former is larger than that on the other. If vice versa, the guide track 5 is smaller on the former than on the other.

The multiple sail units 4 are disposed at certain intervals. The axis of rotation of each sail unit 4 moves on the circle of the circular crevice 7, whereby allowing the revolution of each sail unit around the axis A. Since the multiple sail units 4 are joined by the rotary disk 2c, as described above, the intervals along the circumference among the sail units 4 are maintained the same as they revolve. In addition, the engagement parts 8a and 8b installed on each sail unit moves on the closed curve of the guide track 5. The guide track 5 regulates the rotation angle of each sail unit 4 in the course of its revolution. Consequently, each sail unit 4 rotates as it revolves as a result of the engagement parts 8a and 8b moving on the guide track 5. Although the intervals of the sail units 4 do not necessarily be equal, it is desirable that they are equal, in view of enabling an efficient start of the variation of their rotation angles and reducing and stabilizing the variation of rotation efficiency and also of forming a beautiful design of the system. Since the motion of the sail units 4 looks like flipping cards, however, it is possible to devise a sail unit design and configuration having intentionally different intervals for changes of rotational timing. Furthermore, as will be described later, different design variations, such as a commercial or scenery printing on the sail plates or sheets of the sail units 4 and transparent sail plates or sheets, are also possible.

Figure 10:
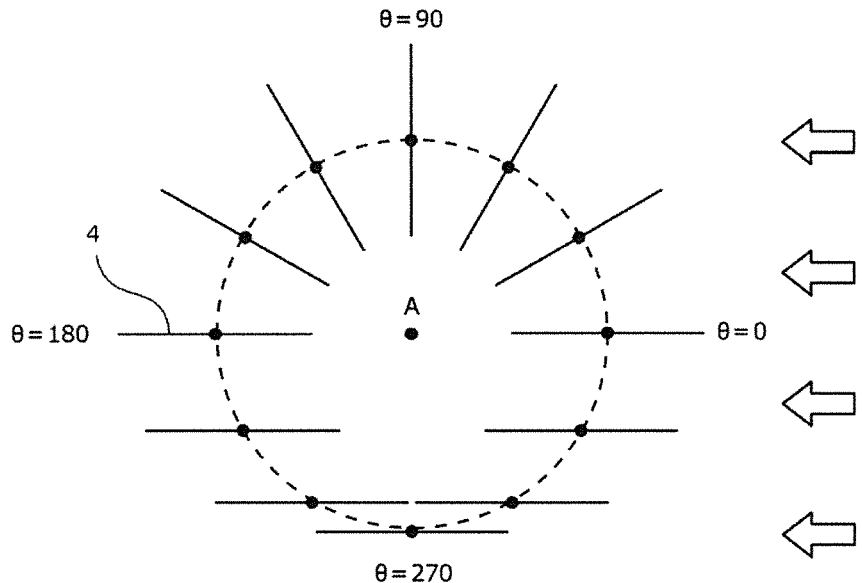
FIG. 10 A diagram illustrating the motion of the sail units concerning the first example.

FIG. 10 illustrates the motion of the sail unit 4 concerning the first example of the present embodiment. The area of wind reception of the sail unit 4 is minimum when the revolution angle θ=0°, gradually increases as the revolution angle 9 increases and becomes maximum when the revolution angle θ=90°. Then, the area of wind reception gradually decreases as the revolution angle θ increases further and becomes minimum when the revolution angle θ=180°. Thereafter until θ=360° (0°), the area of wind reception is maintained minimum. The imbalance of wind reception arises from the difference in the total area of wind reception between the upper half and the lower half of the circle of revolution indicated by a broken line. As a result, only the sail units in the upper half of the circle of revolution receive the wind, and the sail units 4 revolve counterclockwise.

Figure 11:
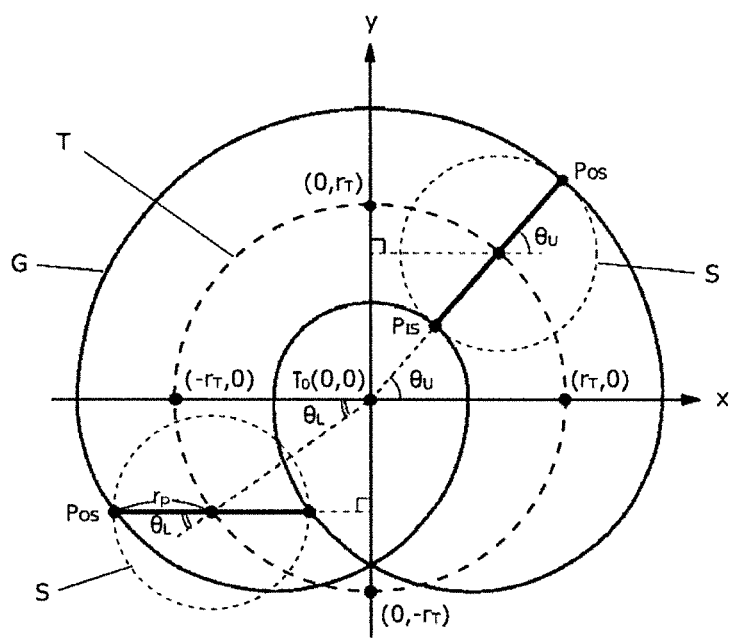
FIG. 11 A diagram illustrating the guide track concerning the first example.

Referring to FIG. 11, we now explain concrete equations for obtaining the shape of the guide track 5 which allows the motion of the sail units 4 as in the first example. The motion of the sail unit 4 is determined by the circle of revolution T (perfect circle), given by a broken line, and the closed guide track G, given by a solid line.

First, the origin $T_O$ for all the coordinates is defined as (x, y)=(0, 0). The circle of revolution T is a perfect circle and represents the perfect circle of the rotary disk 2c, which is also the locus of the center of rotation of the sail unit 4. It is expressed by Eq. 1.

[Exp. 3]

$$x_T^2 + y_T^2 = r_T^2 \qquad \text{Eq. 1}$$

The guide track G represents the guide track for the supporting points (the engagement parts) at both ends of an edge of the sail unit 4 and can be described separately for the upper half region (y≥0) and for the lower half region (y<0). Let's first consider the upper half region (y≥0, θ=0~180°). In this region, the two supporting points of the sail unit 4 draw the small circle S, given by a dotted line, whose center coincides with the center of the edge of the sail unit 4 and whose radius $r_P$ is the distance between the center and either supporting point of the edge. In this region, $θ_U = θ$. The center $S_O$ of the small circle S always resides on the circle of revolution T, and its coordinates are presented by Eq. 2 (a) and Eq. 2 (b).

[Exp. 4]

$$x_S = r_T \cos\theta \qquad \text{Eq. 2 (a)}$$

$$y_S = r_T \sin\theta \qquad \text{Eq. 2 (b)}$$

Thus, the coordinates of the outer semicircle $P_{OS}$ of the guide track G are presented by Eq. 3 (a) and Eq. 3 (b).

[Exp. 5]

$$x_{P_{OS}} = x_S + r_P \cos\theta \qquad \text{Eq. 3(a)}$$
$$= r_T \cos\theta + r_P \cos\theta$$

$$y_{P_{OS}} = y_S + r_P \sin\theta \qquad \text{Eq. 3(b)}$$
$$= r_T \sin\theta + r_r \sin\theta$$

On the other hand, the coordinates of the inner semicircle $P_{IS}$ of the guide track G are presented by Eq. 3 (c) and Eq. 3 (d).

[Exp. 6]

$$x_{P_{IS}} = x_S - r_P \cos\theta \qquad \text{Eq. 3(c)}$$
$$= r_T \cos\theta - r_P \cos\theta$$

$$y_{P_{IS}} = y_S - r_P \sin\theta \qquad \text{Eq. 3(d)}$$
$$= r_T \sin\theta - r_P \sin\theta$$

Therefore, if $r_T$ and $r_P$ are given as the initial condition, the guide track G in the upper half region (y≥0, θ=0~180°) can be obtained from a series of equations Eq. 3 (a)~Eq. 3 (d) described above.

Next, let's consider the lower half region (y<0, 180°<θ<360°). In this region, the two supporting points of the sail unit 4 draw the small circle S, given by a dotted line, whose center coincides with the center of the edge of the sail unit 4 and whose radius $r_P$ is the distance between the center and either supporting point of the edge. In this region, $\theta_L = \theta - \pi$. The coordinates of the center of the small circle S are presented by Eq. 4 (a) and Eq. 4 (b).

[Exp. 7]

$$x_S = -r_T \cos\theta_L \qquad \text{Eq. 4 (a)}$$

$$y_S = -r_T \sin\theta_L \qquad \text{Eq. 4 (b)}$$

Thus, the coordinates of the left semicircle $P_{OS}$ of the guide track G are presented by Eq. 5 (a) and Eq. 5 (b).

[Exp. 8]

$$x_{P_{OS}} = x_S - r_P \qquad \text{Eq. 5(a)}$$
$$= -r_T \cos(\theta - \pi) - r_P$$
$$= -r_T (\cos\theta\cos\pi + \sin\theta\sin\pi) - r_P$$
$$= r_T \cos\theta - r_P$$

$$y_{P_{OS}} = y_S \qquad \text{Eq. 5(b)}$$
$$= -r_T \sin(\theta - \pi)$$
$$= -r_T (\sin\theta\cos\pi - \cos\theta\sin\pi)$$
$$= r_T \sin\theta$$

The coordinates of the right semicircle $P_{IS}$ of the guide track G are presented by Eq. 5 (c) and Eq. 5 (d).

[Exp. 9]

$$x_{P_{IS}} = x_S - + r_P \qquad \text{Eq. 5(c)}$$
$$= -r_T \cos(\theta - \pi) + r_P$$
$$= -r_T (\cos\theta\cos\pi + \sin\theta\sin\pi) + r_P$$
$$= r_T \cos\theta + r_P$$

$$y_{P_{IS}} = y_S \qquad \text{Eq. 5(d)}$$
$$= -r_T \sin(\theta - \pi)$$
$$= -r_T (\sin\theta\cos\pi - \cos\theta\sin\pi)$$
$$= r_T \sin\theta$$

Therefore, if $r_T$ and $r_P$ are given as the initial condition, the guide track G in the lower half region (y<0, 180°<θ<360°) can be obtained from a series of equations Eq. 5 (a)~Eq. 5 (d) described above.

As described above, if $r_T$ and $r_P$ are given as the initial condition, the circle of revolution T can be obtained from Eq. 2 (a)~Eq. 2 (b) and Eq. 4 (a)~Eq. 4 (b) (or Eq. 1). Furthermore, the guide track G in the upper half region (y≥0, θ=0~180°) and in the lower half region (y<0, 180°<θ<360°) can be obtained from Eq. 3 (a)~Eq. 3 (d) and from Eq. 5 (a)~Eq. 5 (d), respectively.

Consequently, the circle of revolution T and the guide track G concerning the first example are represented by the following equations, where the radius of revolution of the sail unit 4 is $r_T$, the radius of rotation of the sail unit 4 is $r_P$, and the revolution angle of the sail unit 4 with respect to the positive x axis is θ.

[Exp. 10]

Upper-half region (y≥0, 0°≤θ≤180°)

$$x = r_T \cos\theta \pm r_P \cos\theta$$

$$y = r_T \sin\theta \pm r_P \sin\theta$$

Lower-half region (y<0, 180°<θ<360°)

$$x = r_T \cos\theta \pm r_P$$

$$y = r_T \sin\theta$$

Figure 12:
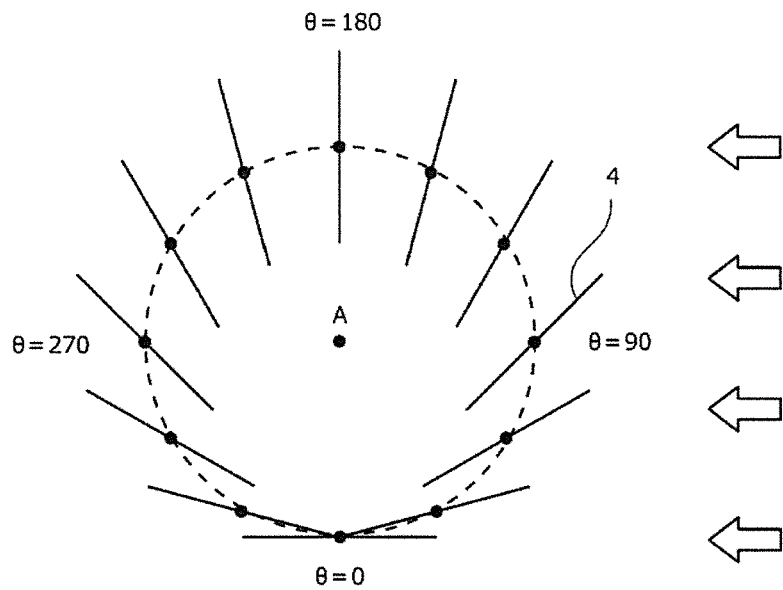
FIG. 12 A diagram illustrating the motion of the sail units concerning the second example.

The motion of the sail unit 4 which is regulated by the guide track 5 is not confined to the first example described above but can have many variations. FIG. 12 illustrates the motion of the sail unit 4 concerning the second example. The area of wind reception of the sail unit 4 is minimum when the revolution angle θ=0°, being measured with respect to the negative y axis, gradually increases as the revolution angle θ increases and becomes maximum when the revolution angle θ=180°. Thereafter, the area of wind reception gradually decreases and becomes minimum again when the revolution angle θ=360° (=0°). Consequently, the imbalance of wind reception arises from the difference in the total area of wind reception between the upper half and the lower half of the circle of revolution indicated by a broken line. As a result, the sail units 4 revolve counterclockwise.

Figure 13:
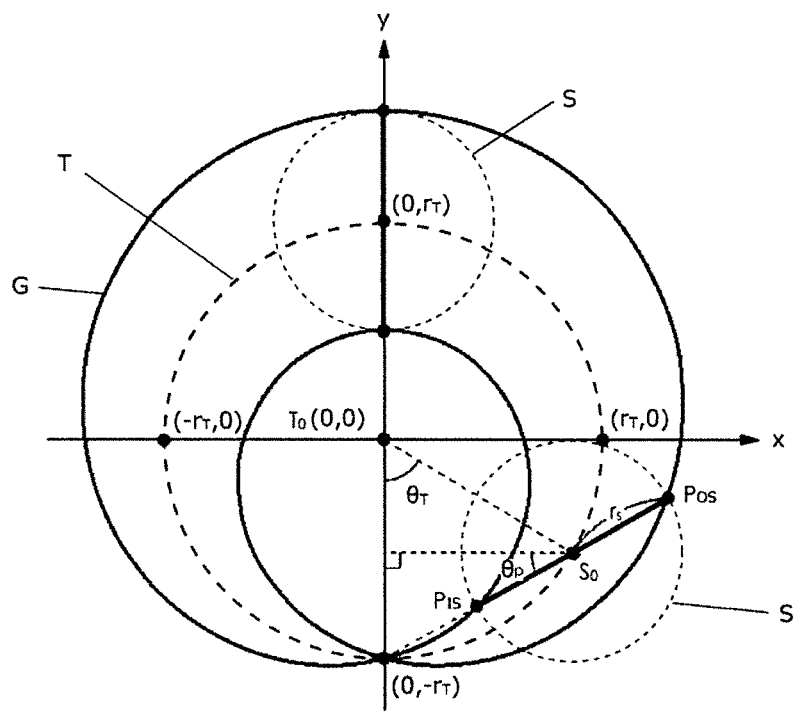
FIG. 13 A diagram illustrating the guide track concerning the second example.

Referring to FIG. 13, we now explain concrete equations for obtaining the shape of the guide track 5 which enables the motion of the sail units 4 as in the second example. The motion of the sail unit 4 is determined by the circle of revolution T (perfect circle), given by a broken line, and the closed guide track G, given by a solid line.

First, the origin $T_O$ for all the coordinates is defined as (x, y)=(0, 0). The circle of revolution T is a perfect circle and represents the perfect circle of the rotary disk 2c, which is also the locus of the center of rotation of the sail unit 4. It is expressed by Eq. 6.

[Exp. 11]

$$x_T^2 + y_T^2 = r_T^2 \qquad \text{Eq. 6}$$

The guide track G represents the guide track for the supporting points (the engagement parts) at both ends of an edge of the sail unit 4 and can be obtained in the following way. It is noted that the relation between $\theta_T$ and $\theta_P$ is given by Eq. 7.

[Exp. 12]

$$\theta_P = \tfrac{1}{2}\theta_T \qquad \text{Eq. 7}$$

In addition, the two endpoints $P_{OS}$ and $P_{IS}$, the center $S_O$ of the sail unit 4 and the point $(0, -r_T)$ can always be connected by a straight line.

We first draw a small circle (a perfect circle) S whose center coincides with the center of the edge of the sail unit 4 and whose radius $r_S$ is the distance between the center and either supporting point of the edge. The center $S_O$ of the small circle S always resides on the circle of revolution T, and its coordinates are presented by Eq. 8 (a) and Eq. 8 (b).

[Exp. 13]

$$x_{S_0} = r_T \sin\theta_T \qquad \text{Eq. 8 (a)}$$

$$y_{S_0} = -r_T \cos\theta_T \qquad \text{Eq. 8 (b)}$$

The coordinates of the outer curve $P_{OS}$ of the guide track G are presented by Eq. 9 (a) and Eq. 9 (b).

[Exp. 14]

$$x_{P_{OS}} = x_{S_0} + r_S \cos\theta_P \qquad \text{Eq. 9(a)}$$

$$= r_T \sin\theta_T + r_S \cos\tfrac{1}{2}\theta_T$$

$$y_{P_{OS}} = y_{S_0} + r_S \sin\theta_P \qquad \text{Eq. 9(b)}$$

$$= -r_T \cos\theta_T + r_S \sin\tfrac{1}{2}\theta_T$$

The coordinates of the inner curve $P_{IS}$ of the guide track G are presented by Eq. 9 (c) and Eq. 9 (d).

[Exp. 15]

$$x_{P_{IS}} = x_{S_0} - r_S \cos\theta_P \qquad \text{Eq. 9(c)}$$

$$= r_T \sin\theta_T - r_S \cos\tfrac{1}{2}\theta_T$$

$$y_{P_{IS}} = y_{S_0} - r_S \sin\theta_P \qquad \text{Eq. 9(d)}$$

$$= -r_T \cos\theta_T - r_S \sin\tfrac{1}{2}\theta_T$$

Therefore, if $r_T$ and $r_S$ are given as the initial condition, the circle of revolution T can be obtained from Eq. 8 (a) and Eq. 8 (b) (or Eq. 6), and the guide track G from Eq. 9 (a)–Eq. 9 (d).

In conclusion, the guide track G concerning the second example is represented by the following equations, where the radius of revolution of the sail unit 4 is $r_T$, the radius of rotation of the sail unit 4 is $r_S$, and the revolution angle of the sail unit 4 with respect to the negative y axis is $\theta$.

[Exp. 16]

$$x_T^2 + y_T^2 = r_T^2$$

$$x = r_T \sin\theta \pm r_S \cos\tfrac{1}{2}\theta$$

$$y = -r_T \cos\theta \pm r_S \sin\tfrac{1}{2}\theta$$

Figure 14:
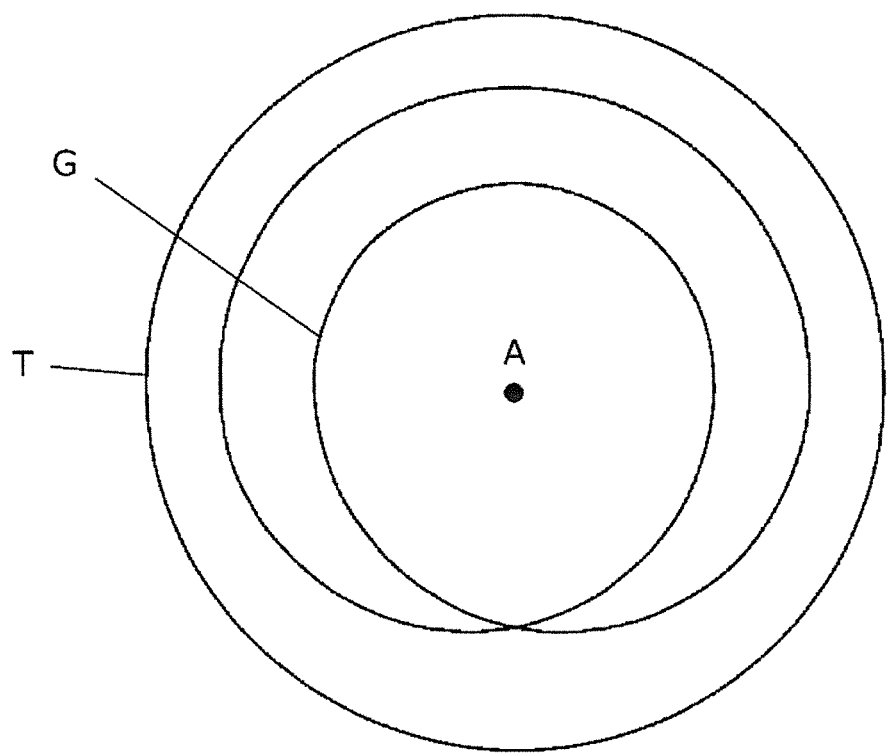
FIG. 14 A diagram illustrating the relation between the circle of revolution and the guide track concerning the third example.

FIG. 14 illustrates the relation between the circle of revolution T and the guide track G concerning the third example. Unlike the first and second examples, the circle of revolution T does not need to overlap with the guide track G and may be disposed outside the guide track G.

In the present embodiment, as described above, the guide track 5 is used to regulate and adjust the rotation angles of the sail units 4 in the course of their revolution. The area of wind reception of the sail 4a becomes maximum (about 100%) in a tailwind and minimum (about 0%) in a headwind. As a result, the imbalance arising from a difference in the area of wind reception occurs efficiently, and the sail units 4 revolve, enabling an efficient conversion of fluid energy (wind power) into rotational energy (torque). This sail device enables to obtain a sufficiently large torque at a rotational speed lower than the wind speed, has a low cut-in wind speed and produces only extremely small noises. In addition, if the sail device 1 is used as a drag-type prime mover, it does not abandon energy even when the wind speed is high, because it does not need a brake system as in the lift-type prime mover. Furthermore, since the sail device 1 regulates and adjusts the rotation angle of each sail unit 4 by means of the engagement parts 8a and 8b engaging with the guide track 5 without using a complex mechanism such as a gear system, the sail device 1 has little mechanical energy loss, hardly experiences mechanical breakdowns and has a higher stability and safety of motion. Consequently, the sail device 1 can achieve a high efficiency of energy conversion with a relatively simple structure, and it is possible to realize the sail device 1 of superior practicality.

In addition, the present embodiment can achieve a more stable and efficient energy conversion, compared with the systems having only one sail unit 4, by installing multiple sail units 4 at certain intervals and at the same time providing the engagement parts 8a and 8b (do not necessarily be multiple) for each sail unit 4.

In addition, the present embodiment can achieve an improved motion stability and mechanical strength of the sail device 1 by increasing the strength of supporting the sail unit 4 as a result of disposing the guide track 5 on both sides of the sail unit 4 and supporting the sail unit 4 at both ends of its edge.

Furthermore, the present embodiment can achieve a further improvement of motion stability and mechanical strength of the sail device 1 by increasing the number of its supporting points as a result of providing multiple engagement parts 8a and 8b on one end or both ends of the edge of the sail unit 4.

It should be noted, as described at the beginning, that the sail device 1 concerning the present embodiment can be used not only for converting fluid energy into rotational energy but also for converting rotational energy into fluid energy.

Second Embodiment

Figure 15:
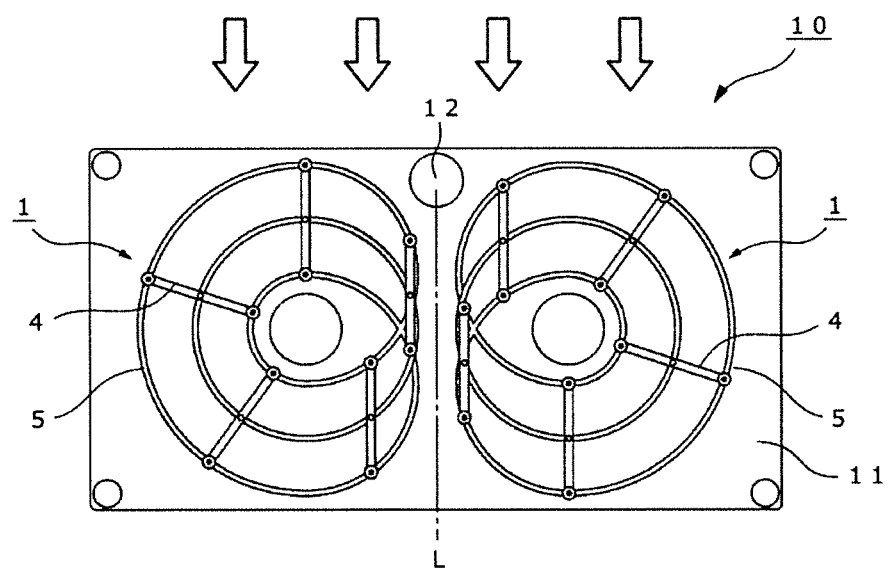
FIG. 15 A top view of the sail devices concerning the second embodiment.

The second embodiment concerns a configuration in which multiple sail devices 1 concerning the first embodiment described above are combined. FIG. 15 is a top view of the sail device (on one side) concerning the present embodiment. This sail device 10 consists mainly of the multiple sail devices 1 installed on the mounting plate 11. The supporting shaft 12 pierces through the mounting plate 11 at the center of its one side, whereby supporting the mounting plate 11 swingably. One sail device 1 is disposed on the right side of the supporting shaft 12, and the other sail device 1 on the left side of the supporting shaft 12. The guide tracks 5 for the left and right sail devices 1 are symmetrical with respect to the line L which divides the mounting plate 11 evenly into the left and right sections.

The present embodiment brings the same effect as that of the first embodiment described above, and the disposition of the right and left sail devices for the symmetrical guide tracks 5 allows the automatic adjustment of the direction of the sail device 10 into the direction confronting the wind. This is because imbalance occurs in the wind reception of (external force on) the left and right sail devices 1 if the sail device 10 slants from the wind direction and then the mounting plate 11 rotates around the supporting shaft 12 to reduce the imbalance. Especially, if the guide tracks 5 are disposed in such a way that the area of wind reception of the sail unit 4 becomes minimum in the area where the left and right sail devices 1 are closest (in the vicinity of the line L), the left and right sail devices 1 can be disposed more closely to each other, whereby compactifying the whole size of the sail device 10.

Third Embodiment

Figure 16:
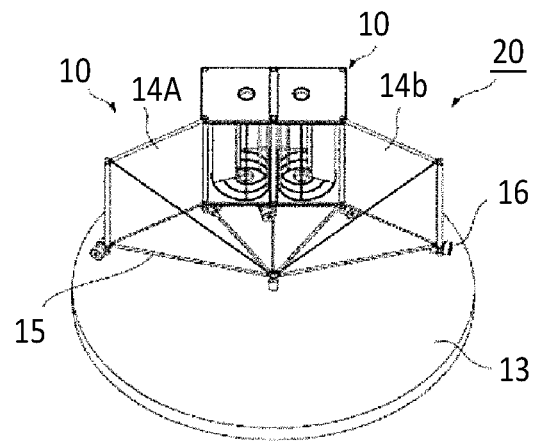
FIG. 16 An external perspective view of the sail devices concerning the third embodiment.

The third embodiment concerns a configuration in which a wind collecting mechanism is added to the sail device 10 concerning the second embodiment described above. FIG. 16 is an external perspective view of the sail device concerning the present embodiment. This sail device 20 consists mainly of the sail device 10 described above, the mounting base 13 and the wind collecting mechanism 14. The mounting base 13 has a nearly circular shape, and multiple connecting rods 15 are installed on its central shaft for free rotation. A pair of flaps 14a and 14b, which compose the wind collecting mechanism 14 and can be freely opened or closed, are installed on both sides of the sail device 10. The wheels 16 and the multiple connecting rods 15 are installed on the sail device 10 and the flaps 14a and 14b. The connecting rods 15 installed on the flaps 14a and 14b are freely extended or contracted so that they do not interfere with the opening and closing of the flaps 14a and 14b. In normal operation without strong winds, however, the length of the connecting rods 15 is fixed at a certain length. The configuration as described above allows the sail device 10 to be supplied with the wind collected by the wind collecting mechanism 14 and to rotate on the mounting base 13 depending on the wind direction.

It is expected that while enough wind power (an average wind speed of more than 7 m/s) can be obtained, for example, on the sea, enough wind power cannot be obtained (an average wind speed of about 2 m/s), for example, in residential areas. Thus, the wind collecting mechanism 14 is installed in the present embodiment for collecting the wind. Namely, the plate-like flaps 14a and 14b installed on both sides of the sail device 10 in a form of extending hands collect the wind for gaining the wind volume (flow rate). At the time of strong winds, on the other hand, damage to these flaps 14a and 14b can be avoided by folding or removing them. In addition, the present embodiment adopts a rotation mechanism consisting of the connecting rods 15 and the wheels 16 for allowing the sail device 10 to confront the wind automatically. Namely, the connecting rods 15 are installed on the central shaft of the mounting base 13 for free swing/rotation, and the wheels 16 allow the sail device 10 to revolve 360 degrees smoothly on the mounting base 13. Consequently, the sail device 10 confronts the wind automatically.

The present embodiment brings the same effect as that of each embodiment described above and, especially, can increase the entering wind volume by means of the wind collecting mechanism 14. In addition, the entering wind volume and the amount of energy conversion can be increased by stacking sets of the sail device 10, the flaps 14 and the connecting rods 15. It is also possible to further increase the entering wind volume by installing flaps additionally on the supporting body (top) of the uppermost sail device 10. Furthermore, the flap can have any structure and form as long as it has the function of collecting fluid. The structure and form of the flap can be freely determined, considering its function and design: for example, the flap can be a flat plate, a curved plate or a combination of a frame and a sheet.

It is noted that in any of the embodiments described above the wind collecting mechanism can be installed on sides (sides other than the supporting bodies 2) of the sail device 10. In this case, the efficiency of energy conversion is not impaired by preventing wind leakage from the left and right sides of the sail device 10 in the process of wind entering at its front side and flowing out of its back side. This mechanism can be achieved by means of flaps or plates as well as sheets (reinforced with frames if necessary). It is also possible to install the equivalent function on the wall, floor or ceiling where the sail device 10 is installed. Furthermore, it is also possible to install a part or parts in the vicinity of the front side of the sail device 10 for changing the wind direction and compressing (densifying) the wind so that the sail units 4 efficiently receive the entering wind. The part(s) allows the sail units 4 moving in the direction opposite to the wind to receive less wind and those moving in the direction of the wind to receive highly dense winds, thereby enabling a further increase of the efficiency of energy conversion. The part(s) can be used not only in the present embodiment but also in the first or other embodiments if its form is modified for the embodiment.

Fourth Embodiment

Figure 17:
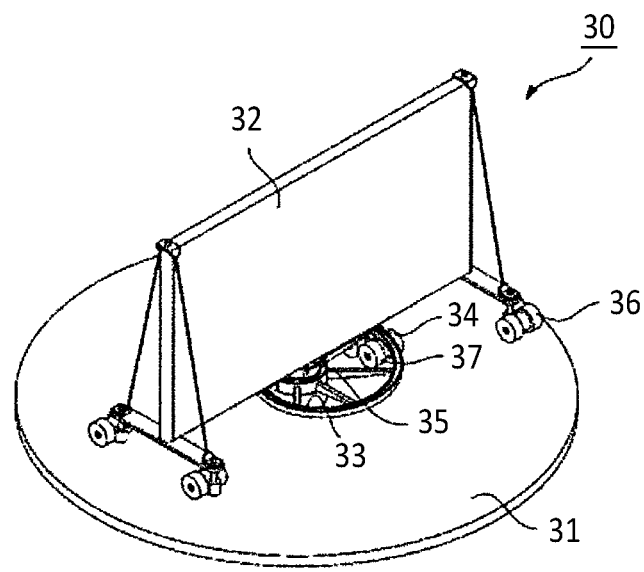
FIG. 17 An external perspective view of the sail device concerning the fourth embodiment.
Figure 18:
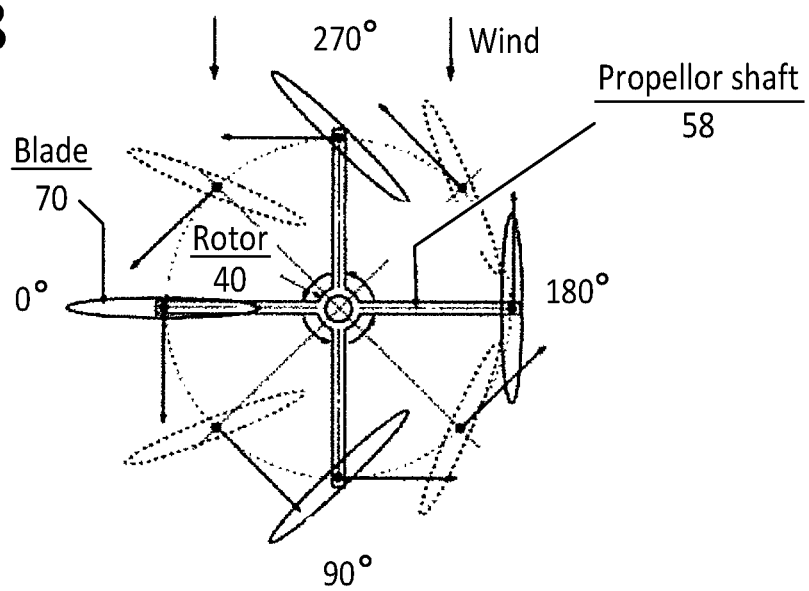
FIG. 18 A view of a conventional drag-type prime mover.
Figure 19:
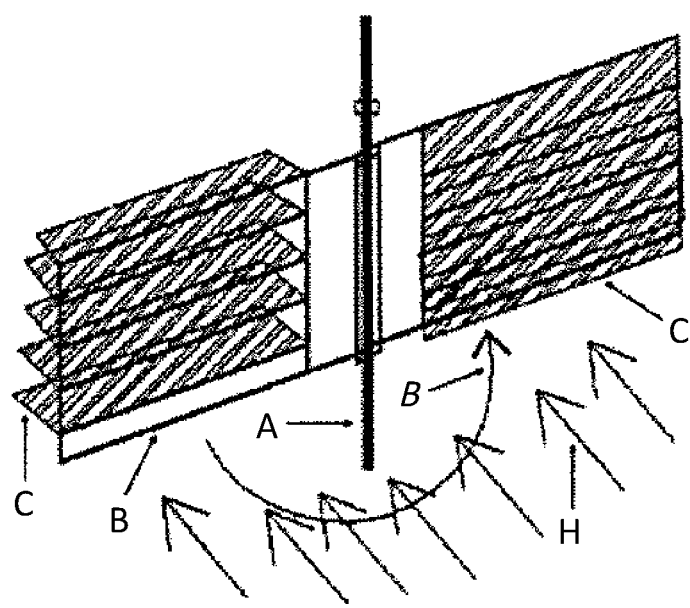
FIG. 19 A view of a conventional drag-type prime mover.

The first through third embodiments described above focus on the energy conversion mechanism for converting fluid energy into rotational energy or rotational energy into fluid energy based on the motion of sails in contact with fluid. The fourth embodiment, however, allows a sail unit to simply revolve and rotate, for example, for commercial advertisement. FIG. 17 is an external perspective view of the sail device concerning the present embodiment. The sail device 30 consists mainly of the supporting body 31, one sail unit 32, the guide track 33 and the engagement part 34. The supporting body 31 has a nearly circular shape, and the crank 35 connected with the sail unit 32 is installed for free rotation at nearly the center of the supporting body 31. This crank 35 allows the sail unit 32 to rotate freely on the supporting body 31 and to revolve around the axis of the supporting body 32. In addition, multiple wheels 36 are installed under the sail unit 32. Furthermore, the sail unit 32 has an advertisement panel on which, for example, a commercial advertisement is printed or a flat-panel display for displaying such advertisement. The guide track 33, on the other hand, is a closed track and regulates the rotation angle of the sail unit 32 in the course of its revolution. In case of FIG. 17, for example, the guide track 33 can be obtained from Exp. 16 described above when $3r_T=r_S$, namely when the radius of rotation is three times that of revolution. The engagement part 34 engages the sail unit 32 with the guide track 33 and allows the sail unit 32 to move along the guide track 33. In addition, since the wheels 37 allow the guide track 33 to rotate freely, the direction of the whole sail device 30, excluding the supporting body 31, can be automatically adjusted so that the sail device 30 nearly faces the most efficient wind direction.

This sail device 30 has the following characteristics. First, it is presupposed that the sail device 30 has only one sail unit 31, and therefore the sail unit 32 does not interfere with other components even if its radius of rotation or size is large. Second, since the size of the sail unit can be large, enough wind power (fluid power) can be obtained, thereby allowing only one sail unit 32 to cover energy for revolution and rotation by wind power (fluid power) as well as energy for decorative lighting and lighting up through self-generation. Third, since the radius of revolution is small compared with the radius of rotation or the size of the sail unit 32, the area for installing the device can be made small. Fourth, if, for example, a display having an aspect ratio of 16:9 or 4:3 is installed on the sail unit 32, it is possible to utilize various image and video contents which can be supplied unlimitedly through the internet. Fifth, the low speed of rotation and revolution of the sail unit 32 is rather beneficial to its function as an advertisement panel, and it becomes possible to show the display in any direction. It is noted that although the sail unit 32 can be rotated and revolved only by wind power, motors can be used simultaneously as a supplementary power source or as the main power source.

Since it is possible in the present embodiment to control how to show the main screen (screen of commercial advertisement) of the sail unit 32 by regulating the rotation angle of the sail unit 32 in the course of its revolution by means of the guide track 33, the effect of commercial advertisement can be improved.

Other than the use for commercial advertisement, the present embodiment can be used, for example, as means for warding off animals and birds in agriculture by installing a reflective plate such as a mirror or a sheet giving complex reflection and lights, if necessary, on the sail unit 32, or as means of giving signals in case of emergency, such as distress and disaster. In such a case, lights can be installed instead on the supporting body 31.

It is noted that, for example, if solar cells are installed on the sail surface of the sail unit 4 or on the outer surface of the supporting body 2 in any embodiment described above, it becomes possible to utilize more than one type of renewable energy.

DESCRIPTION OF REFERENCE SINGS 1, 10, 20, 30: Sail device
2, 31: Supporting body
2a: Outer guide plate
2b: Inner guide plate
2c: Rotary disk
2d: Base plate
3: Connecting rod
4, 32: Sail unit
4a: Sail
4b: Axle
4c: Frame
4d: Sheet
5, 33: Guide track
5a, 5b: Groove
6: Mounting hole
7: Circular crevice
8a, 8b, 34: Engagement part
9: Movable joint
11: Mounting plate
12: Supporting shaft
13: Mounting base
14: Wind collecting mechanism
15: Connecting rod
16, 36, 37: Wheel
35: Crank

The invention claimed is:
1. A sail device comprising:
a pair of supporting bodies;
sail units, each of the sail units comprising a sail being composed of a plate or a frame having a sheet stretched thereon and an axle being attached to and protruding from edges of the plate or edges of the frame and installed on the supporting bodies for free rotation, wherein the sail units are allowed to revolve around a common axis of the supporting bodies;
a pair of closed guide tracks each being installed in each of the supporting bodies and regulating rotation angles of the sail units in the course of the sail units revolving around the common axis;
engagement parts being attached to the edges of the plates or the edges of the frames and protruding adjacent the respective axle in the direction of the axis and being installed movably on the guide tracks, wherein the engagement parts extend from the sail units into the guide tracks and allow the sail units to move along the guide tracks; and
each supporting body includes:
an outer guide plate, an inner guide plate, a rotary disk, and a base plate, which are assembled in such a way that the rotary disk is sandwiched from above and below by the inner and outer guide plates and by the base plate and a cylindrical section of the inner guide plate is inserted into the rotary disk, which is positioned by the cylindrical section and contained rotatably within the supporting body.

2. The sail device of claim 1 wherein using a Cartesian coordinate system having an abscissa x-axis and an ordinate y-axis, each of the guide tracks satisfies the following expressions:

Upper-half region (i.e., y≥0 and 0°≤θ≤180°)

$$x = r_T \cos\theta \pm r_P \cos\theta$$

$$y = r_T \sin\theta \pm r_P \sin\theta$$

Lower-half region (i.e., y<0 and 180°<θ<360°)

$$x = r_T \cos\theta \pm r_P$$

$$y = r_T \sin\theta$$

wherein a radius of revolution of any of the sail units is $r_T$, a radius of rotation of the sail unit is $r_P$, and a revolution angle of the sail unit with respect to the positive x-axis is θ.

3. The sail device of claim 1 wherein using a Cartesian coordinate system having an abscissa x-axis and an ordinate y-axis, each of the guide tracks satisfies the following expressions:

$$x = r_T \sin\theta \pm r_S \cos\tfrac{1}{2}\theta$$

$$y = r_T \cos\theta \pm r_S \sin\tfrac{1}{2}\theta$$

wherein a radius of revolution of any of the sail units is $r_T$, a radius of rotation of the sail unit is $r_S$, and a revolution angle of the sail unit with respect to the negative y-axis is θ.

4. The sail device of claim 1 wherein each of the engagement parts is installed via a movable joint on one edge of each of the sail units.

5. The sail device of claim 1 wherein the guide tracks comprise a first guide track being disposed on one side of the sail units and having a track pattern and a second guide track being disposed on another side of the sail units and having a track pattern the same as the track pattern of the first guide track when the first guide track and the second guide track are disposed face to face and wherein the engagement parts comprise the first engagement parts engaging one edge of each of the sail units with the first guide track and the second engagement parts engaging another edge of the sail unit with the second guide track.

6. The sail device of claim 1 wherein the supporting bodies comprise a first supporting body being disposed on one side of the sail units and a second supporting body being disposed on another side of the sail units, and the first supporting body and the second supporting body are connected with each other by a plurality of connecting rods.

* * * * *

UNITED STATES PATENT AND TRADEMARK OFFICE
CERTIFICATE OF CORRECTION

PATENT NO. : 11,473,557 B2  Page 1 of 1
APPLICATION NO. : 16/625344
DATED : October 18, 2022
INVENTOR(S) : GeungDug Jang It is certified that error appears in the above-identified patent and that said Letters Patent is hereby corrected as shown below:

In the Claims

Column 16, In Claim 2, Line 5:
Delete "Upper-half region (i.e., $y \geq 0$ and $0° \theta 180°$)" and
Insert: -- Upper-half region ($y \geq 0$ and $0° \leq \theta \leq 180°$) --.

Signed and Sealed this
Twenty-fourth Day of January, 2023

Katherine Kelly Vidal
*Director of the United States Patent and Trademark Office*